United States Patent
Erlingsson

(10) Patent No.: US 7,406,542 B2
(45) Date of Patent: Jul. 29, 2008

(54) METHOD AND SYSTEM FOR ASSURED DENOTATION OF APPLICATION SEMANTICS

(75) Inventor: Ulfar Erlingsson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 752 days.

(21) Appl. No.: 10/379,340

(22) Filed: Mar. 3, 2003

(65) Prior Publication Data

US 2003/0179244 A1     Sep. 25, 2003

Related U.S. Application Data

(60) Provisional application No. 60/361,180, filed on Mar. 1, 2002.

(51) Int. Cl.
  *G06F 15/16*  (2006.01)
(52) U.S. Cl. .................................................... 709/246
(58) Field of Classification Search ................. 709/230, 709/246; 718/100; 707/3, 102; 345/619
  See application file for complete search history.

(56) References Cited

U.S. PATENT DOCUMENTS

| | | | |
|---|---|---|---|
| 5,263,147 A | 11/1993 | Francisco et al. | |
| 5,377,317 A | 12/1994 | Bates et al. | |
| 5,497,484 A * | 3/1996 | Potter et al. | 707/200 |
| 5,537,548 A | 7/1996 | Fin et al. | 395/200.04 |
| 5,564,005 A * | 10/1996 | Weber et al. | 715/863 |
| 5,619,639 A | 4/1997 | Mast | 715/798 |
| 5,634,102 A | 5/1997 | Capps | |
| 5,673,403 A | 9/1997 | Brown et al. | |
| 5,760,769 A | 6/1998 | Petrie | 715/759 |
| 5,761,477 A | 6/1998 | Wahbe et al. | |
| 5,764,985 A | 6/1998 | Smale | 719/328 |
| 5,790,127 A | 8/1998 | Anderson et al. | |
| 5,828,893 A | 10/1998 | Wied et al. | |
| 5,832,263 A | 11/1998 | Hansen et al. | 719/322 |
| 5,845,129 A | 12/1998 | Wendorf et al. | |
| 5,913,024 A | 6/1999 | Green et al. | |
| 5,915,085 A | 6/1999 | Koved | |
| 5,918,018 A | 6/1999 | Gooderum et al. | |
| 5,956,507 A | 9/1999 | Shearer, Jr. et al. | 718/104 |
| 5,974,413 A * | 10/1999 | Beauregard et al. | 707/6 |
| 5,974,470 A | 10/1999 | Hammond | 719/331 |

(Continued)

OTHER PUBLICATIONS

Anurag Acharya et al., "MAPbox: Using Parameterized Behavior Classes to Confine Untrusted Applications," Proceedings of the 9th USENIX Security Symposium, Aug. 14-17, 2000, 17 pages.

(Continued)

*Primary Examiner*—Robert B. Harrell
(74) *Attorney, Agent, or Firm*—Sterne Kessler Goldstein & Fox, p.l.l.c.

(57) ABSTRACT

Method and system are disclosed for assured denotation of application semantics ("ADAS"). In a computer system operating at least one application, a method is disclosed for providing assured denotation of application semantics associated with the application. A graphical operation is received for the application. The graphical operation includes at least one argument. The argument is intercepted for the graphical operation, and modified for the graphical operation to provide an indication of at least one application semantic associated with the application.

18 Claims, 9 Drawing Sheets

U.S. PATENT DOCUMENTS

| | | | | |
|---|---|---|---|---|
| 6,014,134 | A * | 1/2000 | Bell et al. | 715/705 |
| 6,023,721 | A | 2/2000 | Cummings | |
| 6,073,157 | A * | 6/2000 | Horiguchi et al. | 718/100 |
| 6,167,520 | A | 12/2000 | Touboul | |
| 6,271,839 | B1 * | 8/2001 | Mairs et al. | 715/807 |
| 6,323,884 | B1 | 11/2001 | Bird | |
| 6,385,724 | B1 * | 5/2002 | Beckman et al. | 713/167 |
| 6,415,385 | B1 * | 7/2002 | Cotugno et al. | 713/176 |
| 6,441,833 | B1 * | 8/2002 | Anderson et al. | 715/762 |
| 6,505,300 | B2 | 1/2003 | Chan et al. | |
| 6,529,985 | B1 | 3/2003 | Deianov et al. | 710/260 |
| 6,587,888 | B1 * | 7/2003 | Chieu et al. | 719/313 |
| 6,657,645 | B2 * | 12/2003 | Costea et al. | 715/805 |
| 6,711,579 | B2 * | 3/2004 | Balakrishnan | 707/102 |
| 6,772,168 | B2 * | 8/2004 | Ardoin et al. | 707/102 |
| 6,772,216 | B1 * | 8/2004 | Ankireddipally et al. | 709/230 |
| 6,807,636 | B2 * | 10/2004 | Hartman et al. | 726/14 |
| 6,865,300 | B2 * | 3/2005 | Kokemohr | 382/260 |
| 7,013,289 | B2 * | 3/2006 | Horn et al. | 705/26 |
| 7,039,875 | B2 * | 5/2006 | Khalfay et al. | 715/762 |
| 7,047,232 | B1 * | 5/2006 | Serrano | 707/3 |
| 7,088,871 | B2 * | 8/2006 | Mairs et al. | 382/293 |
| 2002/0038451 | A1 * | 3/2002 | Tanner et al. | 717/105 |
| 2002/0099952 | A1 | 7/2002 | Lambert et al. | |
| 2002/0137507 | A1 * | 9/2002 | Winkler | 455/426 |
| 2002/0165912 | A1 * | 11/2002 | Wenocur et al. | 709/203 |
| 2002/0186245 | A1 * | 12/2002 | Chandhoke et al. | 345/764 |
| 2003/0227483 | A1 * | 12/2003 | Schultz et al. | 345/763 |
| 2003/0233544 | A1 * | 12/2003 | Erlingsson | 713/167 |
| 2004/0006706 | A1 * | 1/2004 | Erlingsson | 713/200 |
| 2004/0093350 | A1 * | 5/2004 | Alexander et al. | 707/104.1 |

OTHER PUBLICATIONS

Barry Boehm, "Managing Software Productivity and Reuse," University of Southern California, Sep. 1999, pp. 111-113.

P. Deutsch et al., "A Flexible Measurement Tool for Software Systems," Information Processing (Proceedings of the IFIP Congress), 1972, pp. 320-326.

Guy Edjlali et al., "History-based Access Control for Mobile Code," 5th Conference on Computer & Communications Security, 1998, pp. 38-48.

Úlfar Erlingsson et al., "IRM Enforcement of Java Stack Inspection," IEEE, 2000, 10 pages.

Úlfar Erlingsson et al., "SASI Enforcement of Security Policies: A Retrospective," Department of Computer Science, Cornell University, pp. 87-95, no date.

David Evans et al. "Flexible Policy-Directed Code Safety," MIT Laboratory for Computer Science, IEEE, 1999, 14 pages.

Timothy Fraser et al. "Hardening COTS Software with Generic Software Wrappers," TIS Labs at Network Associates, Inc., IEEE, 1999, 15 pages.

Ian Goldberg et al., "A Secure Environment for Untrusted Helper Applications (Confining the Wily Hacker)," Proceedings of the Sixth USENIX UNIX Security Symposium, Jul. 1996, 14 pages.

Robert P. Goldberg, "Survey of Virtual Machine Research," IEEE Computer, Jun. 1974, vol. 7, No. 6, pp. 34-45.

Sotris Ioannidis, "Sub-Operating Systems: A New Approach to Application Security," 8 pages, no date.

Manoj Lal et al., "A Scheduling Scheme for Controlling Allocation of CPU Resources for Mobile Programs," University of California, Davis, Aug. 31, 1999, pp. 1-33.

Dennis M. Ritchie, "The Evolution of the Unix Time-Sharing System," Bell Labs, Lucent Technologies, 11 pages, no date.

Jerome H. Salzter et al., "The Protection of Information in Computer Systems," Proceedings of the IEEE 63, Sep. 1975, 30 pages.

Jeremy Sugarman et al., "Virtualizing I/O Devices on Vmware Workstation's Hosted Virtual Machine Monitor," Proceedings of the 2001 UNSENIX Annual Technical Conference, Jun. 2001, 15 pages.

Robert Wahbe et al., "Efficient Software-Based Fault Isolation," Computer Science Division, University of California, SIGOPS, 1993, pp. 203-216.

* cited by examiner

METHOD AND SYSTEM FOR ASSURED DENOTATION OF APPLICATION SEMANTICS

RELATED APPLICATION

This application claims priority to U.S. Provisional Application No. 60/361,180, entitled "ASSURED DENOTATION OF APPLICATION SEMANTICS," filed Mar. 1, 2002, which is expressly incorporated herein by reference.

FIELD

This invention relates generally to computer systems and user applications and, more particularly, to a method and system for assured denotation of application semantics ("ADAS").

BACKGROUND

The advent of time-shared, multi-user graphical systems gave individual users the ability to interact simultaneously with a single computer system or workstation. For example, in the 1970s, Unix® with X Windows allowed users, e.g., system administrators, to interact simultaneously with the computer system as a "normal user" or a "super user" using any number of windows on a single desktop ("desktop sharing") of the computer system. Typically, minimal privileges were given to a normal user interacting with the computer system, whereas a full set of privileges were given to a super user to maintain and configure the computer system. Separate windows could be used for operating as a normal user and a super user. Generally, to determine if a particular window or interaction area was designated for a normal user or a super user, the user had to make explicit queries, such as "whoami" queries. A disadvantage of these types of systems is that they lack a clear indication of the context regarding the operation of the user. Furthermore, making explicit queries to determine the context of a user's activity hampers work productivity and does not assure the return of correct information.

Thus, operating as multiple users on prior desktop sharing systems can be problematic due to the lack of a clear denotation for each window or user interaction area. For instance, these systems did not discriminate whether a window was supporting a normal user with minimal privileges or a super user with a full set of privileges. Nevertheless, despite the lack of a clear denotation for each window, advanced users could perform multiple tasks as multiple users in multiple windows without error, but this required careful operation and knowledge of the context for each window to perform the desired task. Otherwise, an inadvertent error could result such as deletion of files due to a command executed in a window with a full set of privileges.

Modern operating systems, such as the Microsoft Windows® family of operating systems, also provide desktop sharing. In particular, Microsoft Windows XP® allows a display to support simultaneously multiple desktops, with only one being displayed at time. A user can switch between the desktops with any combination of keyboard sequences. A number of disadvantages exist for these types of systems that provide separate desktops for different user contexts. For instance, switching between different desktops or having a desktop in a window is not very clear, nor scalable, as each desktop is similar to each other, which can also be similar to the user's original desktop. Moreover, each desktop is disjointed and not integrated into the user's original desktop. This is cumbersome and awkward to the user, eliminating otherwise available functionality that hinders the user's ability to perform operations.

Other graphical operating systems and platforms have also used portions of the desktop for activity separate and distinct from the regular environment of a user. For example, remote-access software such as PCAnywhere emulates an entire desktop within a single window on a display of a remote computer system. Likewise, virtual machine software such as Vmware emulates a desktop similar to PCAnywhere. However, these modern operating systems discourage users from operating as multiple users to avoid user confusion. That is, users are encouraged to work exclusively as one user on the computer system.

One technology that also provides for desktop sharing is Java applets. Java applets are programs that can be sent along with a Web page to a user. These programs can perform, e.g., interactive animations, immediate calculations, or other simple tasks without having a user send a request back to a server. Unfortunately, Java applets may originate from untrusted, or even hostile, Web pages. Therefore, their use should be suspect and restricted for purposes of security. In particular, Java applets should be restricted from persistently affecting a user's sensitive data. Sensitive data such as passwords should not be entered within a Java applet window.

A Java applet window can be marked as an "Untrusted Applet Window," which is to remind users not to enter sensitive data. However, using markings provided by Java's "Untrusted Applet Window" fails to be universal or scalable. That is, it functions only for the limited set of applications designed and implemented as Java applets, and, for each of those, shows the same type of alert message, regardless of the applet's context. In addition, the type of marking provided by Java can be tampered with, either inadvertently or maliciously, by non-Java-applet activity on a computer system, e.g., through user actions.

Today, with the availability of desktop sharing systems, a user can perform a variety of different types of activities that have distinctly different relationships with the user's environment. For example, the user can perform activities intended for a corporate or home environment, which produce different types of user interactions and activities. For instance, in a home environment, the user may wish to view Web pages or emails without affecting their environment. In a corporate environment, the user may desire to try new software, installing it on a trial basis, with the intent to revert all of its effects. Furthermore, in a corporate environment, the user may wish to share or link information with other users through "extranets" or "peer-to-peer services." Thus, segregating, limiting, and modifying the potential effects of such activities are desired on desktop sharing systems.

User accounts can limit the effects of activities by different users to that intended and expected by the users on desktop sharing systems. In particular, user accounts encapsulate the information particular to each individual user, such as the user's name, password, area of transient and persistent storage, configuration information, resource-usage quotas and other properties to be enforced on the user's behavior. By using user accounts, time sharing could be implemented without compromising the systems usability. Whereas previous computer system operations always directly affected the global state of the machine, operations on a user's behalf in systems implementing user accounts typically affect only the information in the user's account. In this manner, each user's actions became isolated from other users since, for the most part, they only affected the individual user's account information.

FIG. 1 illustrates the components in a conventional computer system 100 implementing user accounts. Each operation that involves accessing the state of the system is discriminated to determine if the state being accessed is local to an individual user account or global to the entire system (and therefore shared between all user accounts). If access is to a user-local state, the discrimination procedure determines the context of the access operation, that is, which user's account information to access. In conventional systems, context may be determined by, for example, using a low-level indirection (for memory accesses), the current virtual memory page tables, or a user account reference in each process or thread control block (for system calls).

Thus, user accounts can be very useful. They enhance usability when multiple individuals simultaneously use a computing system and allow for segregation of system activity based on intent. For example, conventional systems may use a supervisor user account, called "root," to run background services. Also, web-server activities may operate as "nobody," that is, a user account with very limited privileges. Additionally, user accounts are integral to maintaining the security of a multiple user computer system since they may be used to control which data a user may access or actions a user may perform.

Furthermore, as disclosed in co-pending and commonly owned U.S. patent application Ser. No. 10/144,048, entitled "METHODS AND SYSTEMS FOR USING DERIVED USER ACCOUNTS," filed May 10, 2002, which is incorporated herein by reference, derived user accounts ("DUAs") can also limit the effects of activities by different users to that intended and expected by the users. DUAs are essentially identical to a user's normal working environment, and are designed to enable non-expert users to align their actions with desired intent and potential effects. In particular, DUAs are generated from user accounts in which a DUA is linked to an existing original user account ("OUA"). By using a DUA, its linked OUA may be selectively isolated from system operations. Thus, an advantage of using DUAs is that they are derived from the user's actual environment, and can be arbitrarily integrated with that environment. This enhances the user's ability to work more productively and instinctively with the workstation or desktop. Yet, even using DUA's, there is still no clear denotation or indication that a user is operating within a particular DUA.

Various graphical systems have been proposed, as described in U.S. Pat. No. 6,323,884 and U.S. Pat. No. 5,377,317, to address limited aspects of helping users coordinate their actions in graphical interaction systems. More particularly, graphical systems have been designed, as described in U.S. Pat. No. 5,760,769 and U.S. Pat. No. 5,790,127, that focus on helping users avoid confusion when performing "application sharing" such as when users interact with windows representing activity on remote computers connected, e.g., via teleconferencing with the user's desktop graphical interaction area or in a window. Although teleconferencing application sharing mechanisms can mark the teleconferencing application, these systems do not mark the user's other applications, only those connected via teleconferencing, and do not provide scalability for other types of contexts. In addition, these mechanisms suffer from the same lack of assurance as Java's applet mechanisms. Furthermore, such systems do not clearly or consistently denote and circumscribe different types of activity, nor do they implement mechanisms to limit the effects of the different types of activity without specific tailoring of the applications.

Therefore, as users operate in different environments, it is important that the context of a user's activity be clearly and unambiguously marked in order to provide the users with an indication on how to interact within a particular activity. Thus, there is a need for clear denotation of application semantics, as a user bases interactions with a desktop application based on the context of those applications, i.e., their semantics.

SUMMARY

According to one aspect of the invention, in a computer system operating at least one application, a method is disclosed for providing assured denotation of application semantics associated with the application. A graphical operation is received for the application. The graphical operation includes at least one argument. The argument is intercepted for the graphical operation, and modified for the graphical operation to provide an indication of at least one application semantic associated with the application.

According to another aspect of the invention, a computing system is disclosed that comprises at least one memory having program instructions to execute at least one program component, and at least one processor to execute the program instructions to receive a graphical operation for the application. The graphical operation includes at least one argument. The at least one processor also executes the program instructions to intercept the argument for the graphical operation and to modify the argument for the graphical operation to provide an indication of at least one application semantic associated with the application.

DESCRIPTION OF THE DRAWINGS

The accompanying drawings, which are incorporated in, and constitute a part of the specification, illustrate exemplary implementations and embodiments of the invention and, together with the detailed description, serve to explain the principles of the invention. In the drawings.

DETAILED DESCRIPTION

Reference will now be made in detail to exemplary implementations and embodiments of the invention, examples of which are illustrated in the accompanying drawings. Wherever possible, the same reference numbers will be used throughout the drawings to refer to the same or like parts.

A. Overview

Processing techniques are disclosed for desktop applications that overcome the disadvantages of prior desktop systems and provide a clear and noticeable denotation of application semantics (ADAS). The application semantics, i.e., a type of activity regarding an application, can be clearly marked with a distinct and noticeable indication delineating a particular activity for the application.

In some embodiments, a system can provide a desktop with a graphical denotation that outlines a portion of a window or graphical user interaction area. The graphical denotation represents a particular type of activity or application semantics that provides an indication of the context being implemented or performed for the application. The graphical denotation can also be used within a particular DUA, as described below, to indicate a particular activity within the DUA.

Thus, the following techniques enable users to have a clear and consistent indication of the semantics of application execution in order to differentiate between various types of activities, which may have different possible effects. This allows user to interact with the desktop in a manner appropriate for a particular activity by knowing the context of each activity being performed.

B. Derived User Accounts

Derived user accounts (DUAs) will now be described for certain system operations. DUAs may have all of the properties of traditional user accounts including, but not limited to, its own state, distinct privilege and access control rules, its own unique identifier (such as a security token), and ownership of any system resources. In addition, DUAs are linked to at least one particular existing user account (the Original User Account, or OUA). Through use of a DUA, its OUA may be selectively isolated from system operations taking place in the DUA's context. Since the DUA is a legitimate user account, legacy processes will function correctly in a DUA context while modifications to the OUA can be limited through choice of derivation transformations ("DTs") specified by a set of derivation rules ("DRs").

Figure 1:
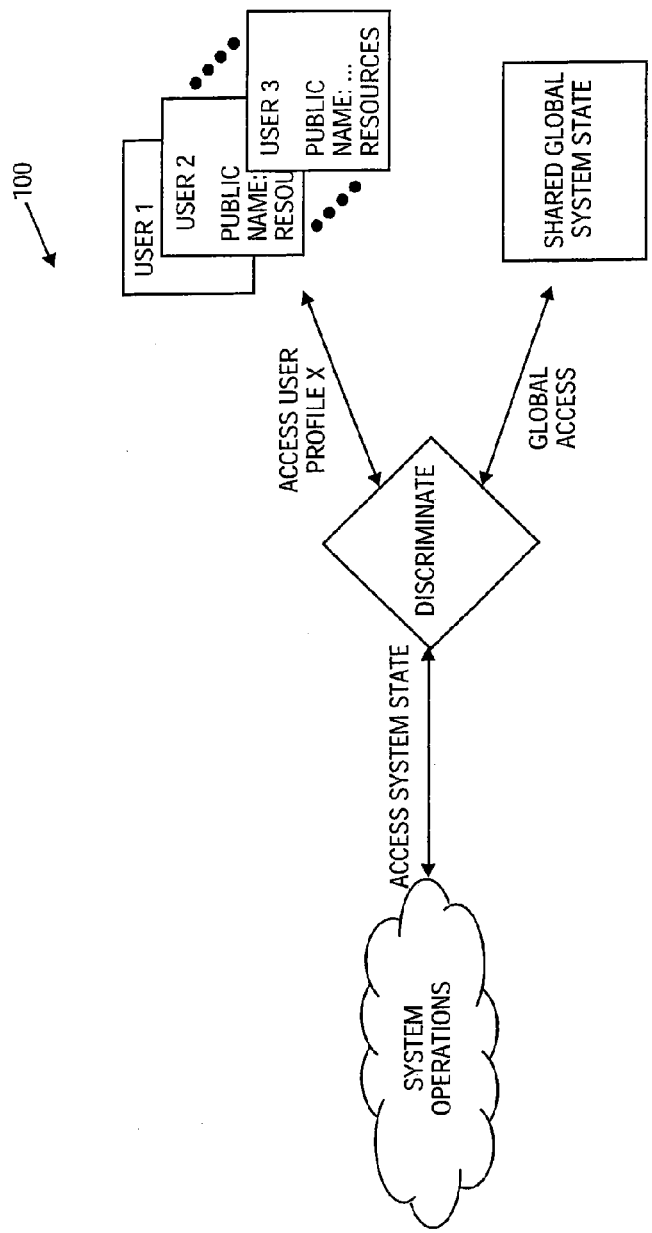
FIG. 1 is block diagram of a conventional system architecture for performing operations accessing state in a multi-user system.
Figure 2:
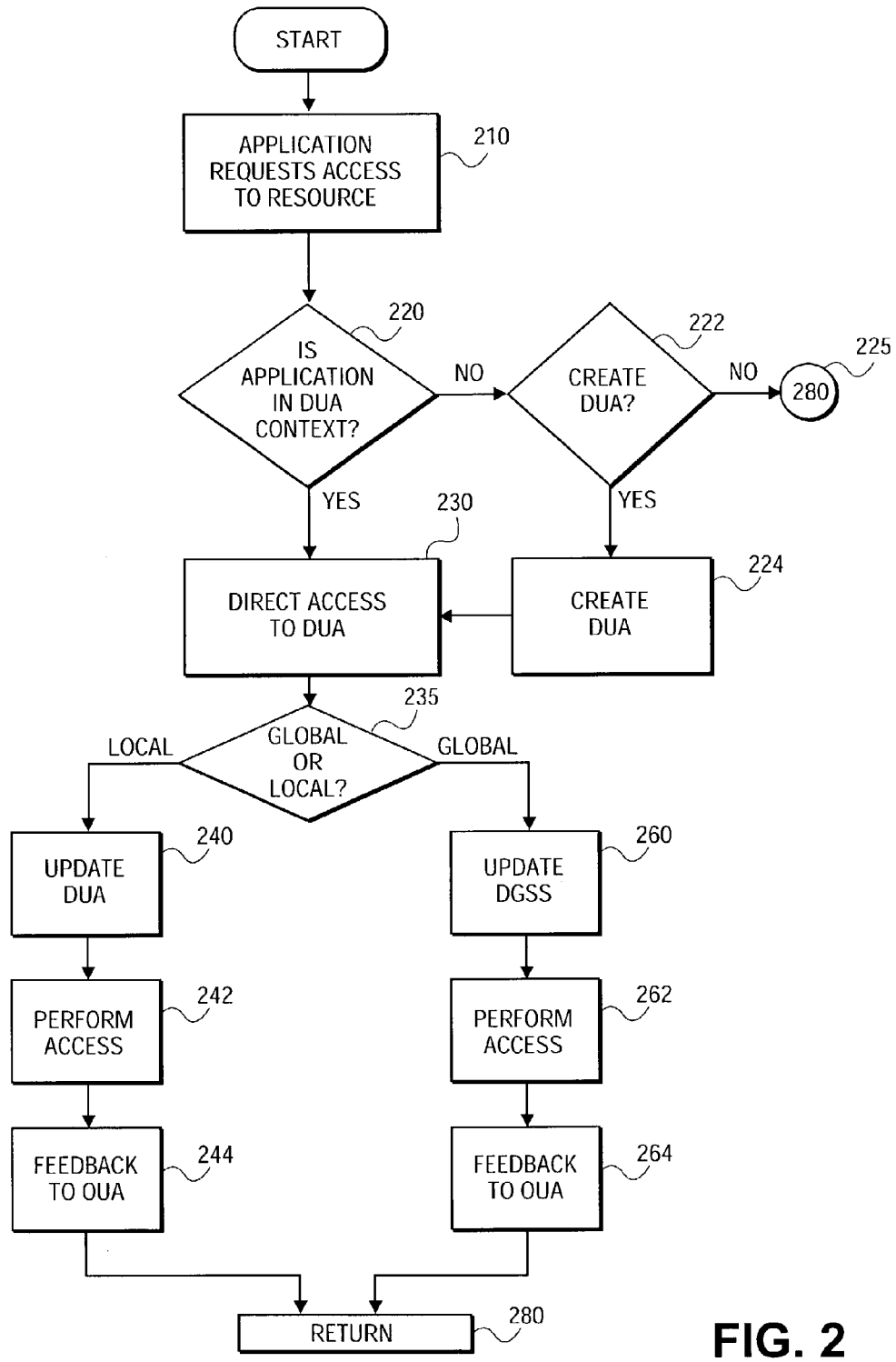
FIG. 2 is a flow diagram of a method for performing access operations using a derived user account.

FIG. 2 illustrates the steps of a method for accessing a resource using a derived user account consistent with the present invention. In one embodiment, a software application, P, requests access to a resource, X (step 210). A "resource" may be, for example, state information, such as data that lies in memory, file systems, registry configurations, other applications, processes, network ports, semaphores, window handles in graphical user interface ("GUI") systems, hardware devices such as a soundcard or printer, or other named abstractions. The system determines if the software application is already running in the context of a DUA (step 220). Methods for determining the context of an object, thread, or other activity are well known to those skilled in the computer software arts. For example, in Microsoft Windows 2000, determining whether a thread is running under a local administrator account may be accomplished by examining the access token that is associated with the thread, the thread's identifier, the thread's creation time, or any other identifier that may be mapped to a specific user account.

If the software application is not running in the context of the DUA, the application determines if a DUA should be "created" (step 222). If the application determines that a DUA should not be created, the application continues normally as in step If it is determined that a DUA should be created (step 224), a DUA may be created according to any of the following exemplary embodiments. In some embodiments consistent with the present invention, a DUA shell may be created by, for example, creating a new user account, "user 2," that may comprise a set different than, or a subset of, the rights and permissions afforded the original user. A DUA shell is the context and the mechanism for propagating the context. The context includes, for example, all information that would normally be associated with an operation in the OUA, such as user credentials, process id, and other information. DUA shells allow for the automatic propagation of DUA context to all DUA activity, for example, processes or threads, whether they be created directly or indirectly as a result of DUA activity. The initial DUA shell may have been established before run-time or established dynamically during operation of the operating system. The creation of the DUA shell may have been invoked randomly or triggered by some event, such as a write access operation.

In this exemplary embodiment, the new user account may comprise rights and permissions that the original user does not have. The new user account, or DUA shell, may be created, for example, by using the existing user account mechanisms in the operating system. Additionally, the ownership of files or objects created or owned by user 2 may need to be modified post-creation to allow the corresponding OUA to have access, if access by OUA is desired. Similarly, user 2 may, by default, access to none or all of the files or objects created or owned by the OUA.

In another exemplary embodiment, a DUA shell may be created by creating a new, possibly restricted, login session or token for the OUA (called OUA', or "OUA prime"). OUA' is distinct and separate from the original OUA session or token, but may have all the same privileges for resources as the OUA, such as, for example, ability to use the same display. In some exemplary embodiments, OUA' may have fewer capabilities than OUA (for example, may not be able to shut down the machine or modify the screen resolution). However, by creating a DUA shell in this fashion in, for example, the Microsoft Windows operating system, the activity of OUA' may be discriminated as the associated token that is automatically propagated to any processes, thread, or other activity created directly or indirectly by OUA.

In yet another embodiment, a process group (in Windows 2000, a "job") may implement the DUA shell. As well as being able to implement a DUA shell, a process group or job may also enforce quotas on resource consumption and, in other ways, control access to resources. For example, a process group or job may perform the automatic context propagation needed for discrimination of the DUA activity.

In still another embodiment, a DUA shell may be created by annotating certain OUA activity as actually belonging to the DUA. Annotation occurs when new OUA activity (that actually belongs to the DUA) is initiated such as, for example, on the creation of a thread, process, or other activity, or the impersonation of the OUA. Annotation may take the form of unique bits or an arbitrary sequence of bits associated with the OUA activity. One example is the use of a distinguished entry in handle tables or file descriptor tables. The annotation may be placed on any one or more components of the OUA activity. In addition, the annotation may be placed on any information in the kernel thread control block ("TCB") or kernel process control block ("PCB"), assuming execution in an operating system with a protected mode kernel. One benefit of annotating information in the kernel TCB or PCB is that the annotation can not be compromised by DUA application activity. In certain embodiments, it is preferred that the annotations are not modified in the ordinary course of events.

In some embodiments where DUA shell implementations automatically propagate the context, the annotation may be done automatically. In other embodiments, such as the embodiment immediately above, new threads, processes, or other activity of the DUA, and those impersonating the DUA, may need to be intercepted and annotated as being in DUA, not OUA, context. In still further embodiments, annotation may involve a combination of automatic annotation and non-automatic annotation.

The DUA may be initialized and maintained based on derivation transformations ("DTs") and derivation rules ("DRs"). Derivation rules are a set of rules that link any aspect of a DUA with the corresponding aspect of its OUA. The derivation rules for a resource, X, include derivation transformations, which are computable functions that take an input, modify the input, and return an output. An argument derivation transformation ("ADT") generally receives an argument as input, modifies the input, and returns a second argument as output, although in some embodiments, the ADT does not modify anything. A result derivation transformation ("RDT") takes as input certain values, modifies the values, and returns modified values. An "update DT" or "UDT" may update the state of a DUA based on its corresponding OUA whereas a "feedback DT" of "FDT" may give feedback from the state of a DUA to the state of its corresponding OUA.

The derivation rules and transformations may be authored by a developer or system administrator. In some embodiments, the derivation rules and transformations may be initially authored by a developer or system administrator but are later modified dynamically. Dynamic rules may be modified during run time according run time dependent conditions or other conditions.

In one embodiment, the derivation rules may take the form of script-like directives. For example, an author of rules may use a text editor or similar device to create a human-readable text file containing the rules. In other embodiments, the rules may be authored in semantic formats such as or similar to known scripting languages or high-level computer languages, or in other formats well know to those skilled in the computer software arts. In still other embodiments, the rules are compiled or otherwise processed by a rule generator into a machine-readable form, which is in turn used by the computer system at run time.

The following is one example of derivation rules consistent with the present invention. The first table comprises an exemplary set of rules for DUA events; the second table comprises an exemplary set of rules for OUA events. Each line in the tables represents a derivation rule which describes the actions that will take place for a particular resource access.

DUA TABLE

| orgname | name 1 | name 2 | open | read | write | list | format |
|---------|--------|--------|------|------|-------|------|--------|
| /A/B | /OUA/A/B | /DUA/A/B | U:X | U:Z F:T | F:Y | U:V | |
| /R/S | /MASQ/R/S | /DUA/R/S | U:X' | | | | |
| /DEV3 | /DEV/NUL | /DEV/HD1 | | | | | U:K0 A:name 1 |

OUA TABLE

| orgname | scrname | destname | open | read | write | list | format |
|---------|---------|----------|------|------|-------|------|--------|
| /A/B | /DUA/A/B | /OUA/A/B | | F:Y | U:W | | |

As shown in the first line of the DUA table above, if an application operating in DUA context refers to /A/B ("orgname"), and the operation is "read", an update derivation transformation, Z, will be performed using /OUA/A/B as the source ("name1") and /DUA/A/B as the destination ("name2"), after which the actual read operation will be performed on the destination. This in one example of an ADT.

In the example above, the update transformation, Z, may also be followed or preceded by a feedback transformation, T, using /DUA/A/B as the source ("name2") and /OUA/A/B as the destination ("name1").

If an application refers to /R/S/ and the operation is "open", the UDT, V, will be performed taking /MASQ/R/S as the input and /DUA/R/S as the output, after which the open operation will actually be performed on /DUA/R/S. /MASQ/R/S is data introduced by the DUA mechanism or the rules and, as described below, may be unrelated to the OUA.

In some embodiments, whether or not a DT is specified, the operation is performed on an actual named resource or object, with the rules having as a default one of the names specified in the DUA table above. In this particular example, name2 represents the actual named resource accessed by all operations by default as specified by design. As shown in the third line of the DUA table, in some embodiments, the operation may be performed on name1, as specified, overriding the default case. This last example may be considered one example of an ADT, as the orgname is modified to name2.

Referring now to the OUA table above, if OUA activity refers to /A/B, and the operation is "read," the system will perform a feedback transformation, Y, using /DUA/A/B as input and /OUA/A/B as output before actually performing the read operation on /OUA/A/B.

There are many possible types of derivation transformations, some examples of which are as follows. "Equivalence DTs" may be used to ensure certain parts of the DUA state and the OUA state remain identical. In this case, for example, the state of the DUA may be copied back to the OUA in an feedback DT or the state of the DUA may be refreshed, for example, by an update DT that copies over one or more aspects of the DUA with information from the OUA. Equivalence DTs may be useful in cases where it is desired to have changes in either the DUA or OUA automatically reflected in the other. For example, the system volume control state may need an equivalence DT if volume changes in a DUA are to have the expected effect.

A "copying DT" can ensure that parts of DUA state are copies of the corresponding OUA state, and that any modifications are performed only on the DUA copy. Copying DTs may be used to limit the effects of operations in DUA context upon the information of its OUA. Copying DTs may be useful in situations where a user may wish to evaluate effects of operations on the system without applying them to the OUA. One example of this would be during installation of new software or during debugging of software. If errors occur while operating with a modified DUA, the original OUA is never actually modified. Thus, operations may revert to the original OUA, and the system may be very quickly and easily returned to the old state. In some embodiments, a user may wish to use a copy DT in non-experimental situations where the system is deliberately operated in the DUA context with no intentions of ever modifying the OUA. This may be useful, for example, for security or integrity reasons. In these embodiments, the DUA may be deliberately discarded after the requested action is performed without update to the OUA.

Yet another example of a derivation transformation is a "masquerading DT." Masquerading DTs can specify properties for certain parts of a DUA state, irrespective of the corresponding state of its OUA. Masquerading DTs can be used to perform operations in a DUA where certain states have values unrelated and (perhaps radically) different from that state's values in the OUA. In fact, a masquerading DT may specify that the data for the DUA may be taken from a source other than the OUA. This type of derivation transformation allows operations to be performed in a modified version of the OUA context. Masquerading DTs may be useful in cases of experimentation because the performance of the system using modified state information may be evaluated without modifying the OUA.

A "partitioning DT" ensures that there is no overlap between certain aspects of the DUA and the OUA state, that is, partitioning their namespace or other sets of values. For example, a partitioning DT may assign a new name, Z, to the DUA and rename the resource, X, to be Y, defined as the concatenation of X with Z. Then, the application is allowed to access the resource Y without accessing the original resource X. Partitioning DTs may be necessary when multiple entities, such as the OUA and DUA, or even multiple DUAs, are concurrently sharing resources and each action must have access to, what appears to be, the full capabilities of that resource. One exemplary operation is the simultaneous access of transient or persistent storage by more than one application. Multiple DUAs can concurrently share state— each believing it has full and exclusive access to that state—as long as a partitioning DT creates a new partition of that namespace for each DUA.

A "liveness DT" changes lifetime properties of certain parts of DUA state from those of its OUA, that is, it may make state that is persistent in the OUA transient in the DUA. The OUA may even be purged at regularly timed intervals. Conversely, any other such state meta-information including, for example, access control attributes, may be set to differ using a liveness DT between the DUA and its OUA.

"Dynamic DTs" may be used to specify an arbitrary relationship between a certain state value found in both the DUA and the OUA. For example, in one embodiment consistent with the present invention, a dynamic DT may remove the ability of a DUA to set volume to its maximum value, while still retaining the DUA's ability to perform operations affecting volume—simply, the dynamic DT can set OUA volume value to 90%, if the DUA volume value is set to 90% or higher, otherwise effecting an equivalence DT. Similarly, a dynamic DT can effect the introduction of a named state to the DUA when that state is not found in the OUA, or the removal of a named state from the DUA when that state is found in the OUA. A dynamic DT may implement this, for example, by modifying the behavior of all state namespace enumeration operations—and with the assistance of a partitioning DT, either account can create or remove such (introduced or removed) state independently.

Derivation transformations may also specify that if an original state value is within a range [A,B] specified by the derivation rule, than the corresponding state value in the DUA is the original state value of the OUA. If not, the state value of the DUA becomes either A or B, whichever is closer to the original state value. This update derivation transformation may be referred to as a "Bounded value" DT. Feedback may also be bounded in a similar manner. In a feedback bounded value DT, for example, if a state value of the DUA is within a range [A,B] specified by the derivation rule, the OUA will get the state value of the DUA. Otherwise, the OUA will receive whichever of A or B is closer to the state value of the DUA.

Still other examples of derivation transformations consistent with the present invention operate on metadata. For example, it may be desired to initially provide access to all information in a data or file, but when copying is performed, it is desired to limit copying to the contents and not copy the metadata, such as access control permissions, time stamps, and name of the file. The derivation rule may block the copying of the metadata but may provide different information in its place, that is, some or all of the metadata may be masked.

An "enumeration" transformation excludes or adds information to a list. An "enumeration" transformation is a variety of a masquerading transformation in the sense that it masks the real information by adding members to the real list or deleting actual members from the real list before allowing access to the list.

One skilled in the art will recognize that there exist many possible derivation transformations and derivation rules. The list above is only exemplary and not meant to comprise the universe of allowable derivation transformations and rules.

Referring back to FIG. 2, once a DUA is created, the application is executed using the DUA, not the original user account. If, for example, the DUA is a new user account, as described above, the application may be redirected to the DUA. If, in another example, the DUA is a token, as is also described above, the application may execute based on permissions in the DUA token. In still another example, the arguments of the application may be modified in accordance with the DUA so that the original application may execute on the modified arguments. The method continues from step 230.

If the application is already operating in DUA context (step 220), the application is executed using the DUA (step 230). The system determines whether the resource sought by the application relates only to a specific user account (that is, a "local" resource) or is information that is shared between multiple user accounts (step 235). If the resource is shared, or "global," the DUA contains derived global system state ("DGSS") information and derivation transformation rules that update or feedback to more than one user account.

In either case, the system determines the type of access requested (steps 240 and 260). Additionally, the DUA or DGSS may optionally be updated by information from the OUA based on the applicable derivation nile before the requested activity is performed (steps 242 and 262). These actions help ensure that the system will have access to the most current information in the OUA. After the DUA or DGSS are updated (steps 242 and 262), the requested activity is performed by reading the DUA or DGSS (steps 244 and 264). Depending on the type of access requested and the derivation transformation rules, the system may optionally communicate changes to the DUA or DGSS back to the OUA in a feedback transformation, if such feedback is indicated (steps 244 and 264).

In each case, after the application performs the requested activity, the system is returned to normal operations (step 280).

Figure 3:
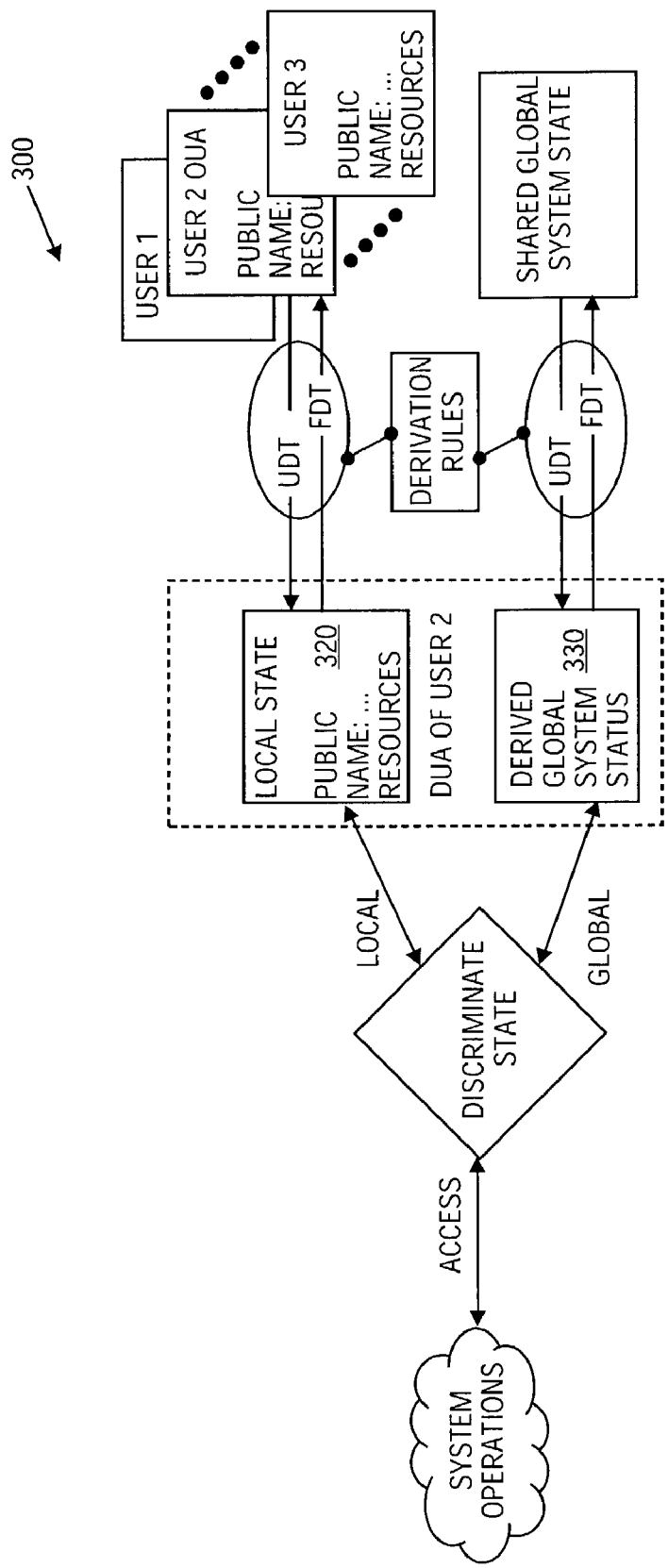
FIG. 3 is block diagram of a system for performing operations accessing state of a derived user account in a multi-user system.

FIG. 3 illustrates the components in a DUA-enabled system 300 consistent with the present invention. As shown in FIG. 3, during operation of an operating system, an application requests access to a system state. Consistent with the principles of the present invention, the system discriminates whether the system is requesting access to local state information 320 of a user account or derived global system state information 330 and directs the requesting application to the appropriate state information of the DUA. As shown in FIG. 3, the DUA state information may be updated based on the corresponding state information of the corresponding OUA and update derivation transformations (UDTs) based on the derivation rules. The DUA may feedback state information to the corresponding OUA based on a feedback transformation (FDT) and the derivation rules. The derived global system state information 330 may be similarly updated based on UDTs and may feed back information to the original shared global system state based on FDTs.

The above represents one exemplary embodiment of the present invention. In some embodiments, DUA events can also occur even though no access is being made to the DUA or OUA resources. In particular, DUA events may occur on a resource X at a specific time, or at specific timed intervals, or given the satisfaction of an arbitrary predicate on the system state or the system environment.

C. Exemplary System Architecture

Figure 4:
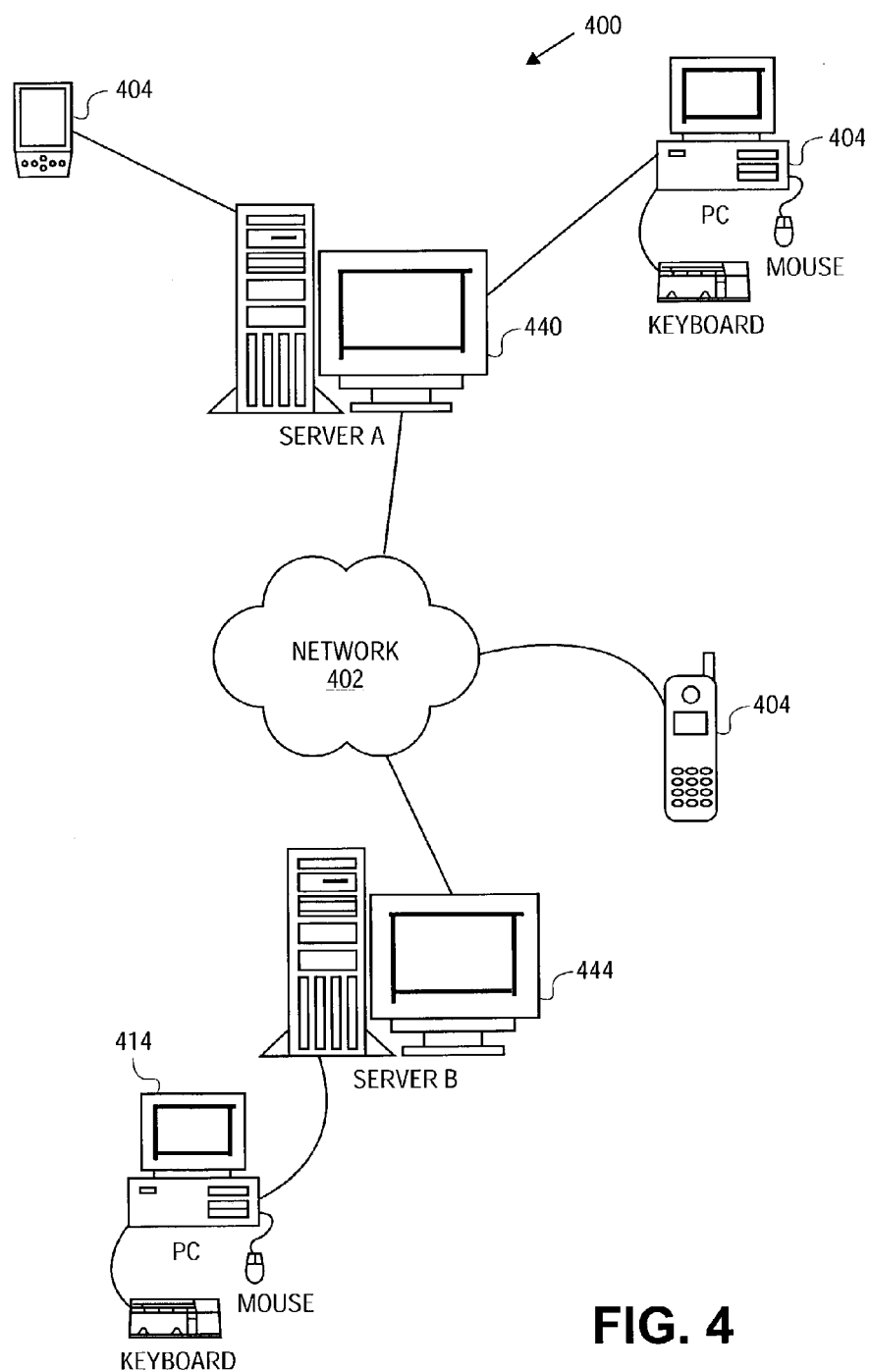
FIG. 4 illustrates one embodiment of a system for using DUAs and implementing ADAS for an application.

FIG. 4 illustrates one embodiment of a system consistent with the present invention. In fact, any conventional computer system supporting the abstraction of user accounts may be programmed to support the principles of the present invention. The system in FIG. 4 represents a computer network 400 that comprises one or more client computers 404 and 414 and one or more servers 440 and 444 interconnected via network 402. In this specification, the terms "client" and "server" are used to refer to a computer's general role as a requester of data (client) or provider of data (server), however each computer may request data in one transaction and provide data in another transaction, thus changing the computer's role from client to server. Client 404 may also be a thin client, which is generally understood to be a network computer without a hard disk drive. Client 404 may also be a personal digital assistant ("PDA"), such as a PalmPilot, a cellular phone, or other computerized device. As shown in FIG. 4, client 404 may be connected to one or more servers by a suitable bus or wireless connection.

In some embodiments, a software application operating on client 404 may place a request that involves data stored on or instructions that are executed on Server A 440. Since client 404 is directly connected to Server A 440 for example, through a local area network, this request would not normally result in a transfer of data or instructions over what is shown as "network" of FIG. 4. The "network" of FIG. 4 represents, for example, the Internet, which is an interconnection of networks. A different request may involve data or instructions stored on Server B 444. In this case, the data may be transferred from Server B 444 through the network to Server A 440 and, finally, to computer 402. The distance between Server A 440 and Server B 444 may be very long, e.g. across states, or very short, e.g., a few inches. Further, in traversing the network the data may be transferred through several intermediate servers and many routing devices, such as bridges and routers.

Figure 5:
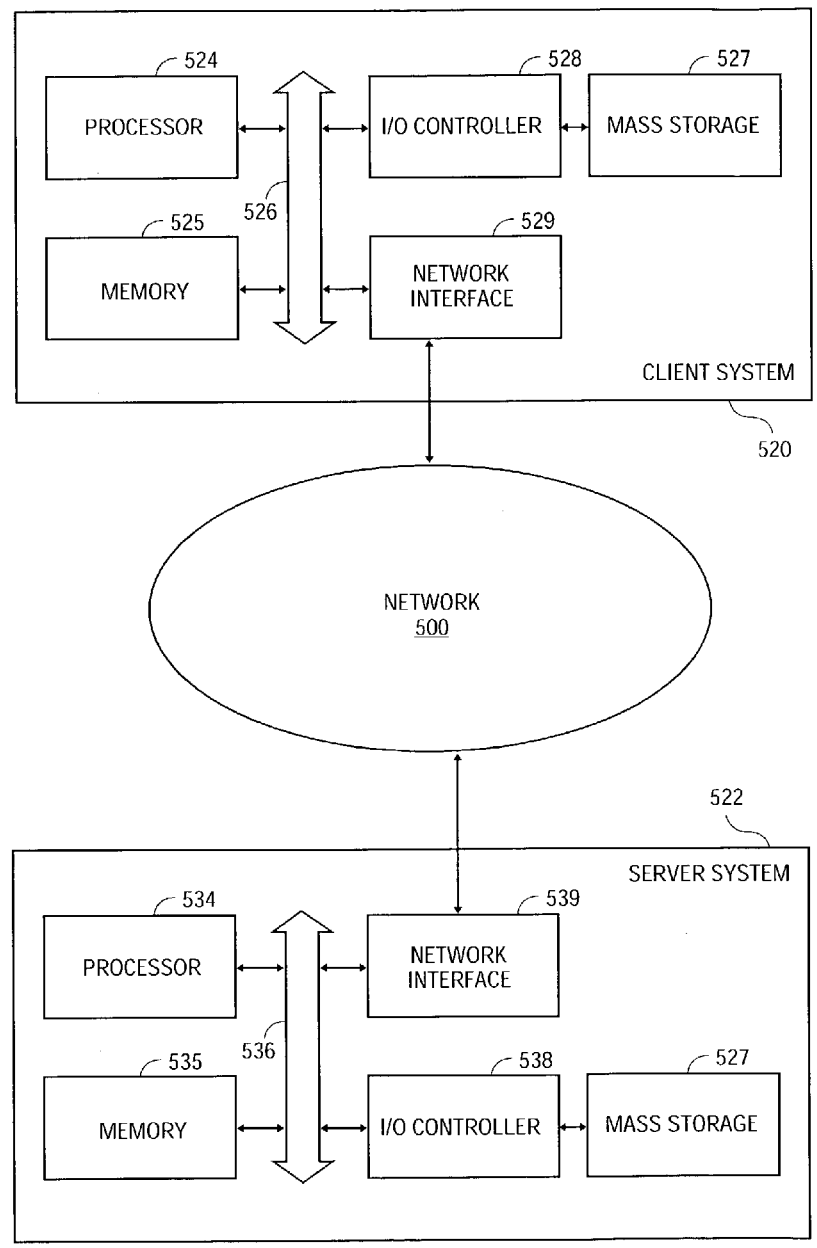
FIG. 5 shows, in more detail, an example of a client-server system interconnected through network.

FIG. 5 shows, in more detail, an example of a client-server system interconnected through network 500. In this example, a server system 522 is interconnected through network 500 to client system 520. Client system 520 includes conventional components such as a processor 524, memory 525 (e.g. RAM), a bus 526 which couples processor 524 and memory 525, a mass storage device 527 (e.g. a magnetic hard disk or an optical storage disk) coupled to processor 524 and memory 525 through an I/O controller 528 and a network interface 529, such as a conventional modem.

Server system 522 also includes conventional components such as a processor 534, memory 535 (e.g. RAM), a bus 536 which couples processor 534 and memory 535, a mass storage device 537 (e.g. a magnetic or optical disk) coupled to processor 534 and memory 535 through an I/O controller 538 and a network interface 539, such as a conventional modem. It will be appreciated from the description below that the present invention may be implemented in software which is stored as executable instructions on a computer readable medium on the client and server systems, such as mass storage devices 527 and 537 respectively, or in memories 525 and 535 respectively. Rules or derivation transformations may be stored in, for example, memory 525 or mass storage 527 on client system 520 or memory 535 or mass storage 537 on server system 522.

Processors 524 and 534 may be microprocessors such as the Pentium® family microprocessors manufactured by Intel Corporation. However, any other suitable microprocessor, micro-, mini-, or mainframe computer, may be used. Memories 525 and 535 may include a random access memory (RAM), a read-only memory (ROM), a video memory, or mass storage. Mass storage 527 and 537 may include both fixed and removable media (e.g., magnetic, optical, or magnetic optical storage systems or other available mass storage technology). Memories 525 and 535 may contain a program, such as an operating system, an application programming interface (API), and other instructions for performing the methods consistent with the invention.

Figure 6:
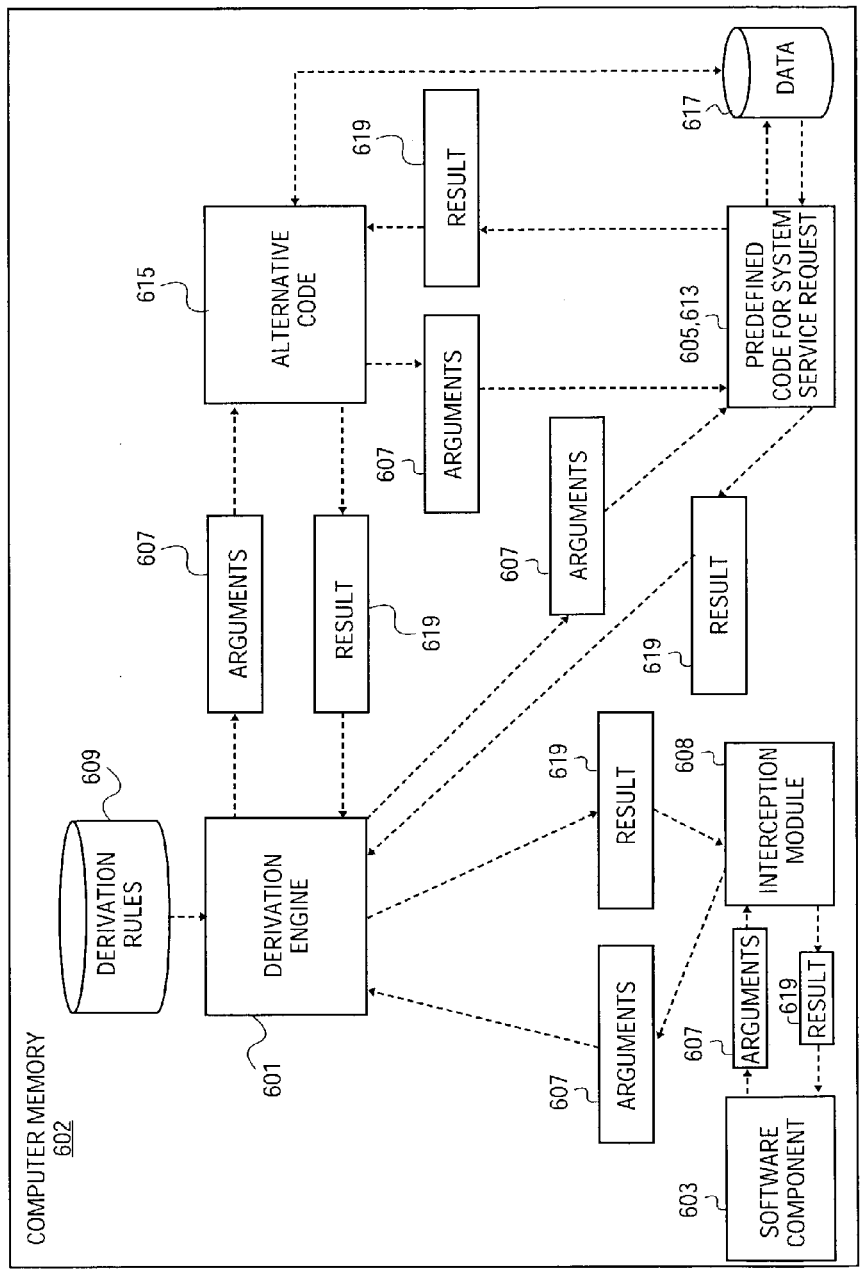
FIG. 6 is a block diagram illustrating one exemplary embodiment of a system using DUAs.

Derived user accounts also may be generated and used in a system, such as that described in co-pending and commonly assigned U.S. patent application Ser. No. 10/082,591 ("the '591 application"), entitled "ALTERED STATES OF SOFTWARE COMPONENT BEHAVIOUR," filed Feb. 22, 2002, which is expressly incorporated herein by reference in its entirety. FIG. 6 illustrates one such exemplary system. As shown in FIG. 6, a software component 603, executing in computer memory 602 may request access to a resource, X. The request may comprise arguments 607, such as a source name or a destination name, and a requested action, such as, for example, open, read, write, list, or format. In one embodiment consistent with the present invention, the request may be intercepted by interception module 608, which may be understood as software code residing between predefined code 605 and the actual software code that is executed in response to the request. Interception module 608 captures the request, including arguments 607, and passes the request and arguments to derivation engine 601 which, as described below, manages the actual calling of code in response to the request.

Techniques for intercepting the request are well known to those of ordinary skill in the software arts. For example, interception of a hardware or software supported system call may comprise redirection of an interrupt service vector to alternative code. For library-based services, interception can take the form of the modification of dynamically-linked libraries (prior to loading or at link time, as desired). For any subroutine or function-based service, redirection of the subroutine call instruction, or machine-code patching of subroutine entry code can be employed. Any service dispatch mechanism based on dynamic name-resolution can be intercepted by a change in the service-lookup namespace.

In other embodiments consistent with the present invention, derivation engine 601 receives a request directly from software component 603. For example, software component 603 may call the derivation engine 601 or derivation engine 601 itself captures software component 603.

Once the request is received by derivation engine 601, either directly or indirectly, derivation engine 601 may consult derivation rules 609, which may be dynamic or static, for assistance in processing the request in accordance with the present invention. Derivation rules 609 comprise derivation transformations, as described above. Based on the derivation rules 609, derivation engine 601 determines how to direct access to a derived user account. For example, if the request specifies to write data to a location A specified by the request, in the DUA context, the arguments 607 of the request may be modified by derivation engine 601 in accordance with derivation rules 609. In one exemplary embodiment, as described with reference to the DUA table shown above, if a request (which in this example is an application) requests that a read operation be performed on original name "/A/B," and the appropriate derivation rule comprises the derivation transformation, Z, which specifies that read operations on /OUA/A/B should instead be performed on /DUA/A/B, the arguments of the request may be modified so that /DUA/A/B is the source of the data for the read operation.

Once derivation engine 601 modifies arguments 607 in accordance with the derivation rules, derivation engine 601 may pass arguments 607 to predefined code 605 or alternative code 615. In addition, alternative code 615 may invoke predefined code 605 at some point during its execution. In some embodiments, alternative code 615 may modify data 617 or dynamic derivation rules 609. A result 619 may be returned from execution of predefined code 605 or alternative code 615 to derivation engine 601. Derivation engine 601, in turn, returns result 619 to software component 603.

D. Assured Denotation of Application Semantics

Figure 7:
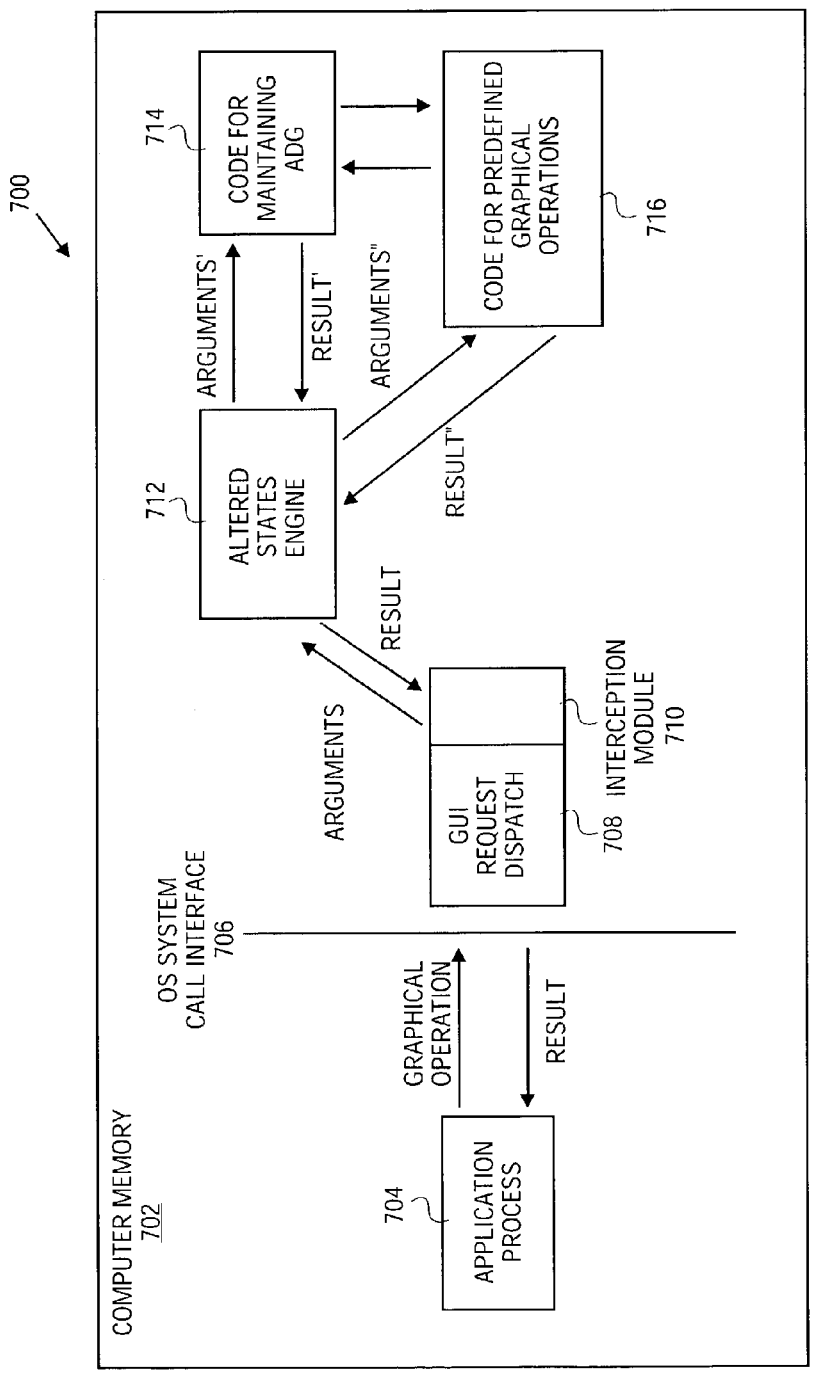
FIG. 7 is a block diagram illustrating one exemplary embodiment of a system implement ting ADAS with an altered states engine.
Figure 8:
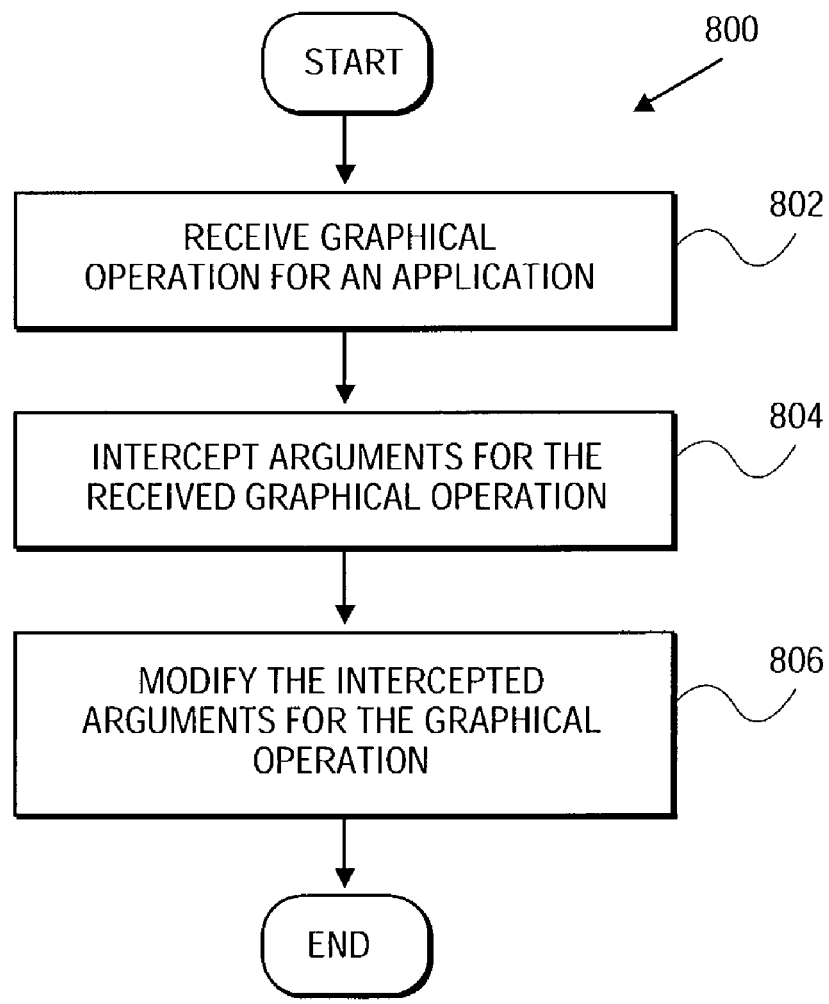
FIG. 8 is flow diagram of a method for performing operations to implement ADAS for an application.
Figure 9:
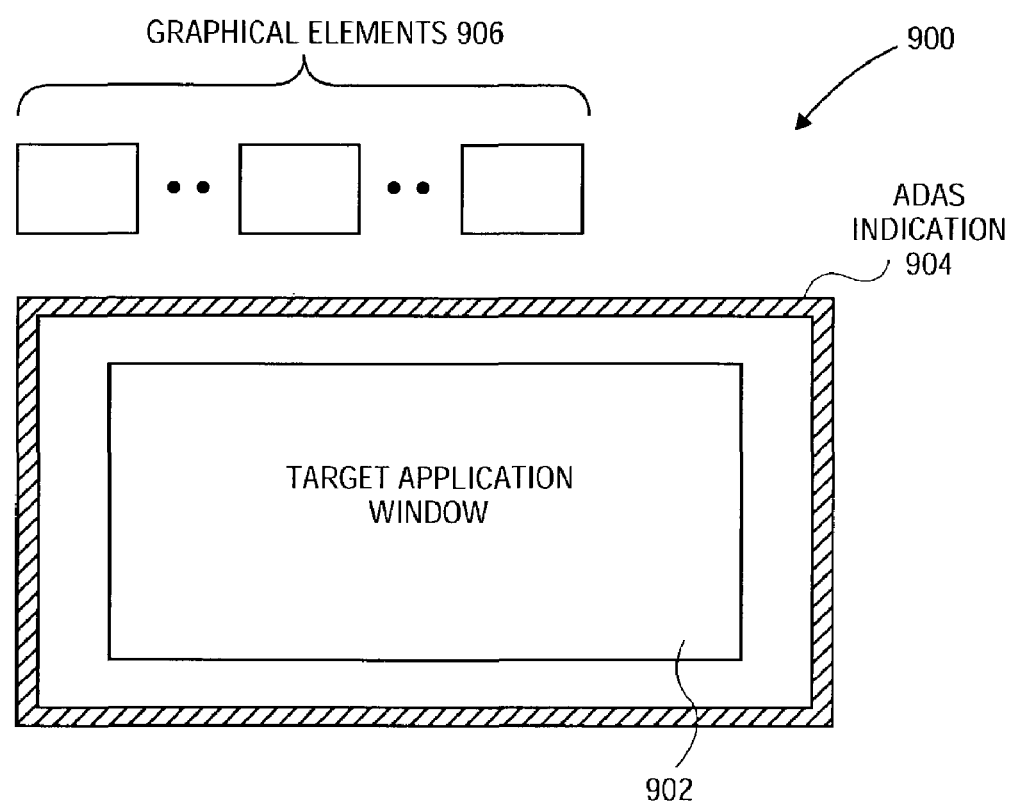
FIG. 9 illustrates an exemplary embodiment of a target application with an ADAS indication.

The following description regarding FIGS. 7-9 describes assured denotation of application semantics (ADAS) consistent with the present invention. As described in FIGS. 7-9, systems, such as those disclosed herein, can provide a desktop with a graphical denotation that marks (e.g., outlines) a portion of a window or graphical user interaction area to distinguish between a particular type of activity or application semantics. This allows a user to interact with a desktop in a manner appropriate for a particular activity by knowing the context of each activity being performed.

FIG. 7 is a block diagram illustrating one exemplary embodiment of a system 700 implementing ADAS with an altered states engine 712 and interception module 710 within computer memory 702. Referring to FIG. 7, the basic components of the ADAS system 700 include an application process 704, interception module 710, and altered states engine 712, all of which can execute within computer memory 702 as program components. The altered states engine 712 and interception module 710 can be implemented in a manner, as disclosed in the co-pending and commonly assigned '591 application noted above.

The exemplary embodiment of FIG. 7 mediates graphical operations from the application process 704 at an operating system (OS) call interface 706. In this embodiment, the OS call interface 706 should not be subverted, circumvented, or otherwise compromised by the application process 704. To implement ADAS according to this example, arguments included in the graphical operation from application process 704 are intercepted and processed by altered states engine 712. Altered states engine 712 uses program components such as code for maintaining altered graphical details (AGD) 714 and code for predefined graphical operations 716 to provide a graphical denotation for an application semantic related to application process 704.

The AGD program component 714 can maintain the states of all ADAS indications, including the contexts of the application semantics related to the application process 704 or other application processes. The code for redefined graphical operations 716 can include a library of code or instructions to provide result" that can provide varying types of ADAS indications, as described below in FIG. 9, for the graphical operation. Similarly, the AGD program component 714 can also provide code or instructions (indirectly from code 716) or directly as result' that can provide varying types of ADAS indications.

The AGD program component 714 can thus interact with code 716 directly, likewise altered states engine 712 can also interact with code 716 directly. The above program components within computer memory 702 can be integrated with an operating system kernel, or any other subsystem that is both protected from subversion by other applications, and can mediate on all graphical operations for application process 704 or other applications.

In some embodiments, using AGD program component 714 and code 716, altered states engine 712 can modify or alter the graphical operation for the application by, e.g., providing a marker or indication circumscribing a target application window, as described in FIG. 9. In other embodiments, altered states engine 712 can modify or alter the target application window by resizing, hiding, activating, etc. the window to maintain an ADAS indication. In addition, certain target application graphical operations, such as making windows that cover an entire display area, can also be modified by altered states engine 712 to ensure the visibility of the ADAS indication. Altered states engine 712 can apply specific rules for the modification of the graphical operations. An exemplary operation implementing ADAS using the altered states engine 712 within the ADAS system 700 will now be described in regards to FIG. 8.

FIG. 8 is flow diagram of a method 800 for performing operations to implement ADAS for an application. Initially, a graphical operation is received for an application such as application process 704 (step 802). Referring to FIG. 7, a graphical user interface (GUI) request dispatch 708 receives the graphical operation via an operating system (OS) call interface 706. The graphical operation can include any number of arguments.

The arguments for the graphical operation received by the GUI request dispatch 708 are intercepted by interception module 710 (step 804). Interception module 710 can intercept the arguments using techniques as disclosed in the co-pending and commonly assigned '591 application noted above. In this process, interception module 710 forwards the arguments from the received graphical operation to altered states engine 712.

Altered states engine 712 modifies the intercepted arguments for the graphical operation (step 804). For example, referring to FIG. 9, the arguments for the graphical operation could be for displaying a target application window 902 in which altered states engine 712 can modify the arguments to also display ADAS indication 904 circumscribed around target application window 902. The ADAS indication 904 can specify a particular context for the activity being performed within the application.

In this process, altered states engine 712 extracts information from the intercepted arguments regarding the position and size of the application's user-interaction area, e.g., the position and size of target application window 902 of FIG. 9. This information is used by altered states engine 712 to modify the arguments for the graphical operation. For instance, altered states engine 712 can forward modified arguments (arguments') to code for maintaining altered detail graphics (ADG) 714. The program component 714 can use code for predefined graphical operations 716 to provide an output result (result') to altered states engine 712, which can be forwarded to the application process as the result for the graphical operation. Alternatively, altered states engine 712 can send modified arguments (arguments") directly to the code for predefined graphical operations 716 to obtain an output result" as the result for the graphical operation. Either result' or result" can be sent as the result for the graphical operation.

This process of using the program components 714 and 716 can be implemented in a separate and protected process to effect a clear denotation to the user that circumscribes the application's user-interaction area, e.g., ADAS indication 904 for target application window 902 of FIG. 9.

FIG. 9 illustrates an exemplary embodiment of a target application window 902 with an ADAS indication 904 for display on a desktop. Other graphical elements 906, such as icons, can be displayed on the desktop. Graphical elements 906 can also represent other application windows, windows operating within a DUA described above. Each graphical operation related to any of the graphical elements can be implemented with the ADAS indication techniques described herein.

The ADAS indications should be clearly and noticeably marked. In particular, the following are exemplary characteristics that ADAS indications should have in order to be noticeable and recognized by a user:

Clear and Consistent: ADAS indications should be visible and noticeable, look the same, and always circumscribe or otherwise be clearly associated with the windows, or other interaction points, to be identified with certain application semantics.

Non-obtrusive: ADAS indications should be intuitive—not interfere with a user's working environment, or work habits and processes—and should not be cumbersome, e.g. by its slowness or dissimilarly with the end-user's expected appearance or behavior.

Assured: ADAS indications should not be able to remove or otherwise disrupt the application semantics, nor should the user or other system activity be able to do so, either inadvertently or purposefully.

Universal: ADAS indications should work with any applications, regardless of their construction or intended purpose, as they may be incorporated into an activity whose semantics need be identified or executed with modified semantics (e.g., in a DUA).

Scalable: ADAS indications should support simultaneous use of multiple, different types of activity, each of which should be identified as having particular semantics.

ADAS indications should support multiple, simultaneous DUA's executing applications.

Referring to FIG. 9, ADAS indication 904 denotes a particular type of activity by circumscribing target application window 902. In this exemplary embodiment, ADAS indication 904 is shown as a graphical outline with a distinct and noticeable pattern. ADAS indication 904 can also be shown any type of noticeable color or static/animated pattern, different from other visual components shown on the display of the desktop. showing on the desktop. For instance, on a desktop using a gray color scheme, the ADAS indication 902 could be represented as a rectangle with a saturated bright primary color around target application window 902.

It should be noted that ADAS indication 904 is not obtrusive to the user and does not modify the graphical behavior of target application. In other words, as shown in FIG. 9, ADAS indication 904 only outlines the graphical user-interaction area—i.e., target application window 902. In certain embodiments, ADAS indication 902 can be a thin line (not a thick line) that does not cover a disproportionate amount of the display area. Furthermore, ADAS indication 902 should be highlighted to represent that target application window 902 is active, and should offer the same functionality as the edges of the original target application window 902. For instance, ADAS indication 902 should allow a user to select the target application window 902 as having the focus, to drag or resize the target application window 902, or retrieve a context menu for the target application window 902.

Alternatively, regardless of the color schemes used, ADAS indication 904 could be a blinking or animated outline tightly drawn around target application window 902, or irregular in shape for an irregular target application window. For example, ADAS indication 904 can be easily derived from an application window extents and the outlines of shapes from irregular or semi-transparent windows. In other embodiments, ADAS indication 904, regardless of color or shape, can be drawn either directly on the display of the desktop, or created as a separate graphical window by some process other than the target application window process. For example, ADAS indication 904 does not have to circumscribe target application window 902, but should be located in close proximity to target application window 902 to identify the semantic related to that application process or activity.

In still other embodiments, ADAS indication 904 can be a less obtrusive marker, e.g., a noticeable symbol, that does not outline target application window 902 in order to avoid cluttering the display of a desktop with too much information that may confuse users. For instance, for target application windows that are embedded in other windows, or smaller windows such as a toolbox, the less obtrusive marker can be used.

As described above, the scalability of ADAS indication 904 can be achieved using different colors, patterns, or animations for ADAS indication 904 around target application window 902 to differentiate varying types or semantics for different types of applications. For example, ADAS indication 904 can denote viewing of Internet content or email attachments by drawing a distinct, high-contrast animated outline. Other examples can include ADAS indication 904 denoting peer-to-peer interaction with corporate partners by drawing a distinct static, solid color outline. Thus, two ADAS indications can be drawn, each representing a different application semantic.

The ADAS indication techniques described herein provide a clear and distinct denotation that represents the segregation of multiple, and often simultaneous, roles users have thereby providing users a seamless manner to intuitively and with assurance perform activities in multiple contexts, e.g., within a DUAs. Thus, users can with assurance base their interactions on the context denoted by the ADAS—i.e., the end-users can interact with graphical windows assuredly knowing both the intent of their action and the effect they can expect.

Thus, a method and system for assured denotation of application semantics have been described. Although the above description discloses ADAS for graphical user-interaction areas (windows), the above ADAS techniques can work for any type of human interaction device. For example, in audio interaction systems, a particular distinct sound at the beginning and end of certain activity could delineate the application semantics of that particular activity using the techniques described above.

Furthermore, the present invention also relates to computer readable media that include program instruction or program code for performing various computer-implemented operations based on the methods of the present invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using, for example, an interpreter or equivalent execution engine to facilitate execution of high level code. Alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system operating at least one application, a method for providing assured denotation of application semantics associated with the application when run in one or more contexts, the method comprising:
receiving a graphical operation for the application, the graphical operation including an argument;
intercepting the argument for the graphical operation;
modifying the argument for the graphical operation according to a particular context; and
providing an indication to a user, based on the modified argument, that denotes at least one application semantic associated with the application when the application is run according to the particular context.

2. The method of claim 1, wherein the particular context of the application is related to a derived user account (DUA).

3. The method of claim 1, wherein the indication providing includes circumscribing a window related to the application with the indication.

4. The method of claim 1, wherein the indication providing includes providing the indication in close proximity to a window related to the application.

5. The method of claim 1, wherein the indication providing includes providing the indication with a noticeable pattern.

6. The method of claim 1, wherein modifying the argument is unobtrusive to the application.

7. A computing system comprising:
at least one memory having program instructions to execute at least one program component; and
at least one processor to execute the program instructions to perform operations for providing assured denotation of application semantics associated with an application when run in one or more contexts comprising:
receiving a graphical operation for the application, the graphical operation including an argument;
intercepting the argument for the graphical operation;
modifying the argument for the graphical operation according to a particular context; and
providing an indication to a user, based on the modified argument, that denotes at least one application semantic associated with the application when the application is run according to the particular context.

8. The computer system of claim 7, wherein the particular context of the application is related to a derived user account (DUA).

9. The computer system of claim 7, wherein the indication providing operation performed by the processor includes circumscribing a window related to the application with the indication.

10. The computer system of claim 7, wherein the indication providing operation performed by the processor includes providing the indication in close proximity to a window related to the application.

11. The computer system of claim 7, wherein the indication providing operation performed by the processor includes providing the indication with a noticeable pattern.

12. The computer system of claim 7, wherein the processor modifies the argument and is unobtrusive to the application.

13. A computer-readable medium containing instructions for controlling a computer system, operating at least one application, to perform a method for providing assured denotation of application semantics associated with the application when run in one or more contexts, comprising:
receiving a graphical operation for the application, the graphical operation including an argument;
intercepting the argument for the graphical operation;
modifying the argument for the graphical operation according to a particular context; and
providing an indication to a user, based on the modified argument, that denotes at least one application semantic associated with the application when the application is run according to the particular context.

14. The computer-readable medium of claim 13, wherein the instructions further control the computer system to perform a method such that the indication providing provides an indication of at least one application semantic associated with a derived user account (DUA).

15. The computer-readable medium of claim 13, wherein the instructions further control the computer system to perform a method such that the indication providing includes circumscribing a window related to the application with the indication.

16. The computer-readable medium of claim 13, wherein the instructions further control the computer system to perform a method such that the indication providing includes providing the indication in close proximity to a window related to the application.

17. The computer-readable medium of claim 13, wherein the instructions further control the computer system to perform a method such that the indication providing includes providing the indication with a noticeable pattern.

18. The computer-readable medium of claim 13, wherein the instructions further control the computer system to perform a method such that the argument modifying is unobtrusive to the application.

* * * * *